INVENTORS
William H. Middendorf
Edward J. Fritz
BY
Wood, Herron & Evans
ATTORNEYS

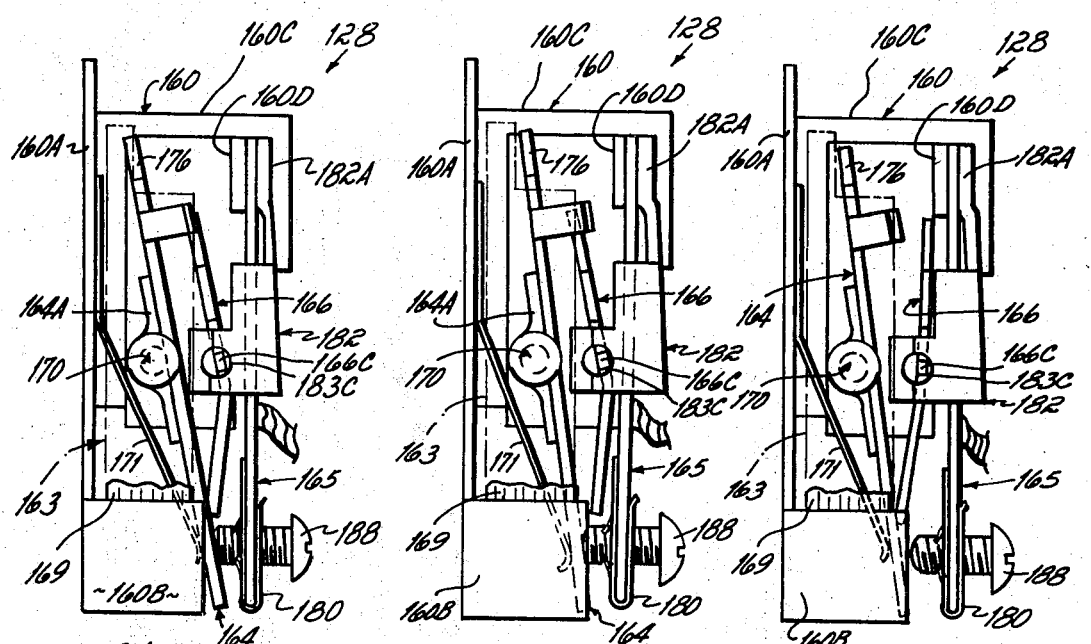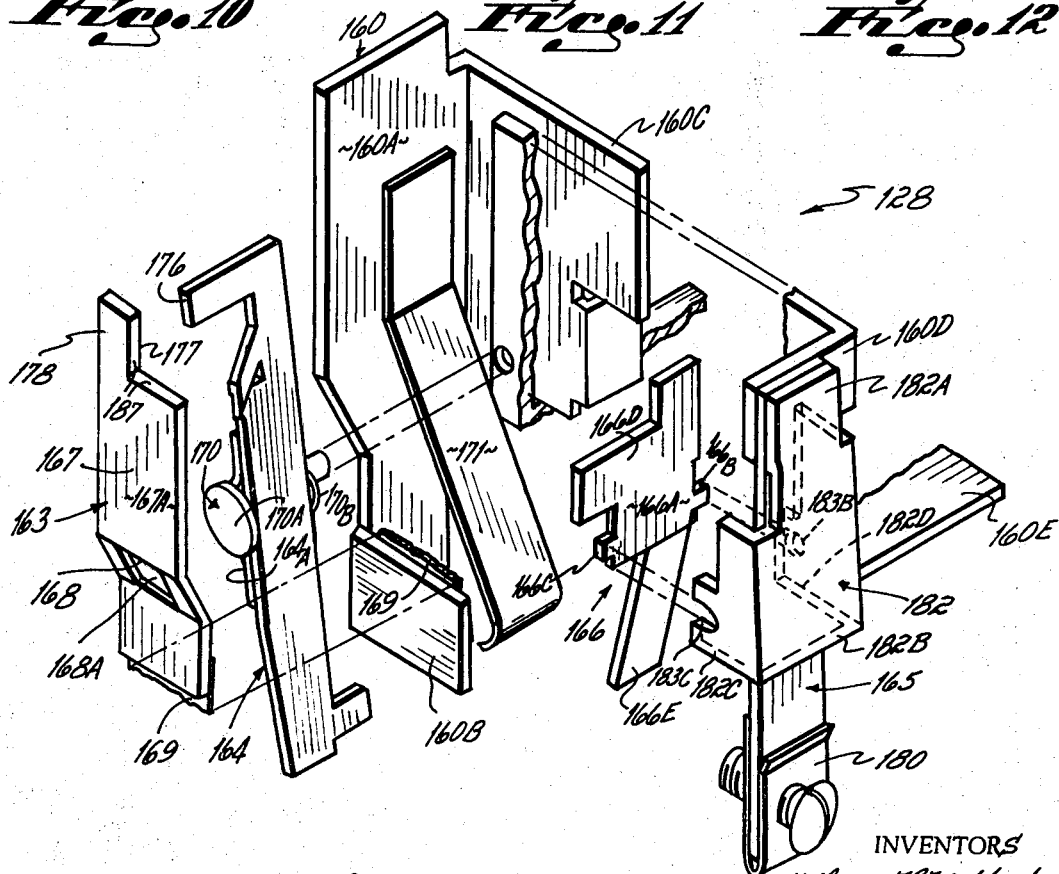

United States Patent Office 3,566,326
Patented Feb. 23, 1971

3,566,326
CIRCUIT BREAKER
William H. Middendorf, Fort Mitchell, and Edward J. Fritz, Florence, Ky., assignors to The Wadsworth Electric Mfg., Co., Incorporated, Covington, Ky., a corporation of Kentucky
Continuation-in-part of application Ser. No. 689,640, Dec. 11, 1967. This application Jan. 26, 1970, Ser. No. 5,693
Int. Cl. H01h 71/16, 71/40, 73/50
U.S. Cl. 337—55          20 Claims

ABSTRACT OF THE DISCLOSURE

A circuit breaker having a fixed contact, a movable contact, a movable carrier mounting the movable contact, and a tripping mechanism for disconnecting the contact in response to overload currents. The carrier is spring-biased, and mounted for pivotal movement between an unlatched position wherein the contacts are electrically disconnected, and a latched position wherein the contacts are selectively connectable. The tripping mechanism is in series electrical circuit with the fixed and movable contacts for releasably maintaining the carrier in the latched position under non-overload current conditions, thereby enabling the series electrical circuit to be selectively completed, and for releasing the carrier to permit it to return to its unlatched position in response to overload current conditions, thereby interrupting the circuit connection between the fixed and movable contacts. The tripping mechanism includes a pivotal main latch selectively engageable with the carrier to maintain the carrier in the latched position, an auxiliary latch pivotal transversely relative to the main latch for selectively holding the main latch in a position to engage the carrier, and a bimetal movable in response to overload currents for pivoting the auxiliary latch which in turn releases the main latch enabling the latter to pivot, releasing the carrier and electrically disconnecting the fixed and movable contacts.

---

This application is a continuation-in-part of application Ser. No. 689,640, filed Dec. 11, 1967 and now abandoned.

This invention relates to circuit breakers and, more specifically, to circuit breakers having fixed contacts and selectively positionable spring-biased rockers or carriers mounting movable contacts which utilize overload current responsive tripping mechanisms to permit the carriers to move from latched positions to unlatched positions, and thereby interrupt the circuit between the fixed and movable contacts.

A circuit breaker, broadly viewed, is an electrical switch constructed to open automatically, and thereby interrupt the flow of current in the circuit in which it is connected, in response to predetermined overload current conditions. The circuit breaker, like the conventional fuse, functions to protect against fire hazards produced by the over-heating of electrical devices in which unduly high currents flow due to malfunctions such as short circuits, overloads, and the like. Circuit breakers, however, unlike fuses in which destruction is incidental to use, are designed to be reusable.

By way of illustration, a conventional single-pole circuit breaker typically includes a stationary contact fixed to an insulative housing, and a movable contact. The state of connection or disconnection of the fixed and movable contacts determines whether the circuit breaker permits or prevents current to flow in the circuit in which the breaker is connected. Also included is a rocker or carrier assembly which supports the movable contact. The rocker is pivotally mounted to the housing for movement between an unlatched position wherein the contacts are disconnected, and a latched position wherein the contacts are selectively connectable to complete a circuit. An overload current responsive tripping mechanism series connected with the fixed and movable contacts is provided to maintain the rocker in the latched position, and the contacts selectively connectable, only so long as the current through the breaker remains below the overload level. Should the overload current level be reached, the tripping mechanism is actuated and the rocker released, permitting the rocker to return to its unlatched position wherein the movable contact carried thereby is spaced from the fixed contact to interrupt the circuit.

In the design of a conventional single-pole circuit breaker of the type described, a number of structural and operational criteria must be satisfied if a satisfactory circuit breaker is to be produced at minimum cost. For example, a circuit breaker should have high contact pressure. Contact pressure, which refers to the force between the fixed and movable contacts per unit area of contact surface, must be high in order that the circuit breaker be reliable and cool-running in operation. A circuit breaker should also be compact. This permits high amperage circuit breakers to be encased in insulative housings normally designed for circuit breakers of low amperage. Thus, larger housings are not required for circuit breakers of greater capacity. Utilization of the same size housings for both large and small amperage circuit breakers permits a certain degree of parts standardization, and reduces the inventory requirements of those required to manufacture circuit breakers of different capacity. Compactness is also inherently advantageous inasmuch as it allows a small circuit breaker panel to be employed in any given circuit breaker installation.

Circuit breakers, additionally, should be designed to retain factory calibrated tripping characteristics despite housing dimensional variations and instability. This permits greater tolerances to be used in circuit breaker fabrication and consequent cost reduction, without sacrificing or compromising reliability and uniformity in tripping characteristics. Finally, circuit breakers should be readily combinable into a multi-pole arrangement having common or ganged tripping characteristics. Such a capability enables the dollar investment in circuit breaker inventory to be kept at minimum levels since single-pole circuit breakers can be used as building blocks for ganged-trip multi-pole breakers.

Accordingly, it has been an objective of this invention to provide a single-pole circuit breaker which is characterized by compactness, high contact pressure, ready susceptibility of use as a building block in a ganged multi-pole circuit breaker, and uniformity of tripping characteristics despite dimensional variation and instability of the breaker housing. This objective has been accomplished in accordance with the principles of this invention by utilizing a very novel and unobvious approach to the design of an overload current responsive tripping mechanism for selectively maintaining the movable contact supporting rocker or carrier of the conventional circuit breaker in a latched or untripped condition.

Specifically, this invention contemplates providing, in a circuit breaker having fixed and movable contacts and a spring-biased rocker mounting the movable contact, an overload current responsive tripping mechanism which includes a uniquely coacting main latch, auxiliary latch, and bimetal movably mounted on a frame secured to the housing. In accordance with this arrangement, the main latch is positioned to selectively engage the rocker, holding it in its latched position wherein the contacts are selectively connectable to complete a circuit through the breaker. The main latch is maintained in engagement with the rocker by the auxiliary latch which, in its latched position, abuts the main latch, preventing its disengagement with the rocker. Disengagement of the main latch and rocker to interrupt a circuit through the breaker is effected by the bimetal. The bimetal bends in response to an overload, in turn pivoting the auxiliary latch transversely of the main latch out of abutting relation with the main latch, releasing the main latch and permitting the rocker to return to its unlatched or tripped position wherein the movable and fixed contacts are separated and the circuit through the breaker interrupted.

By reasonable of the movable elements of the tripping mechanism of this invention being arranged subtsantially parallel to each other, a circuit breaker construction results which is extremely compact.

In addition, by reason of the auxiliary latch pivoting only in a direction transverse to the main latch, the auxiliary latch withstands and absorbs increases in spring force applied to the main latch by the rocker and does so without significantly increasing the force that must be developed by the bimetal to pivot the auxiliary latch, thereby unlatching the main latch and rocker and tripping the circuit breaker. Thus, the transverse pivotal movement of the auxiliary latch relative to the main latch effectively isolates the bimetal from increases in the spring force, enabling the spring force and, hence, the contact pressure to be substantially increased without significantly increasing the force that need be developed by the bimetal to effect circuit breaker tripping.

Also, by reason of locating the point of application of the force between the rocker and main latch closely adjacent the axis of the main latch, component of the spring bias force applied to the main latch via the rocker in a direction perpendicular to the main latch axis is very small relative to the component applied thereto in an axial direction. Since it is this perpendicular spring force component which is transmitted to the auxiliary latch by the main latch, it is the perpendicular spring force component, reduced by a factor equal to the coefficient of friction between the auxiliary latch and bimetal, that must be overcome by the force developed by the bimetal to effect tripping. With the perpendicular component of the spring force a small fraction of the total spring force and the bimetal force a fraction of the perpendicular spring force component, the spring force can be greatly increased to produce large contact pressures without significantly increasing the bimetal force necessary to effect tripping.

The circuit breaker construction of this invention, because of its use of a single frame for mounting the movable elements of the tripping mechanism, provides a tripping mechanism which can be factory calibrated prior to assembly in the housing, and which retains its tripping characteristics despite dimensional variations and instability of the housing in which the frame is mounted.

In addition, the circuit breaker of this invention is readily adaptable for use as a building block in a ganged or common trip multi-pole circuit breaker. Specifically, by disposing the tripping mechanism such that the auxiliary latch pivots transversely toward the sides of the housing, it is possible to mechanically interconnect or gang the auxiliary latches of a plurality of single-pole breakers arranged in juxtaposed, side-by-side alignment by merely inserting a bar having slots to engage the auxiliary latches transversely through aligned holes in the juxtaposed housings. With such an arrangement, should one circuit breaker trip due to an overload current therethrough, the others are automatically tripped by reason of the common trip or gang bar. The gang bar shifts laterally, pivoting the auxiliary latches of the non-overloaded breakers, in response to supplemental pivotal motion of the auxiliary latch of the overloaded breaker imparted thereto by the carrier-urged main latch following tripping of the circuit breaker in response to initial pivoting of the auxiliary latch induced by bending of the bimetal.

Other objectives and additional advantages of this invention will be more readily apparent from the following detailed description taken in conjunction with the drawings in which:

FIG. 9 is an exploded perspective view of an alternative tripping mechanism embodiment of this invention.

FIG. 10 is an elevational view of the tripping mechanism of FIG. 9 showing the operating elements in the untripped position.

FIG. 11 is an elevational view of the tripping mechanism of FIG. 9 showing the operating elements in the tripped position, the tripping having been produced as a consequence of a sustained overload of relatively small value.

FIG. 12 is an elevational view of the tripping mechanism of FIG. 9 showing the operating elements in the tripped position, the tripping having been produced as a consequence of an instantaneous overload of relatively large value.

As shown in FIGS. 1–6, a preferred form of circuit breaker constructed in accordance with the principles of this invention includes a housing 10 for encasing and positioning the various operating components of the circuit breaker to be described. The housing 10 preferably is constructed of two mating sections only one of which is shown, and fabricated of insulative material to electrically isolate the various operating components enclosed therein. In addition, the housing 10 is internally configured to provide positioning and mounting surfaces for the circuit breaker components enclosed therein, and configured externally to permit a plurality of identical single-pole circuit breakers to be closely positioned in juxtaposition, thereby providing a compact multi-pole circuit breaker.

Figure 6:
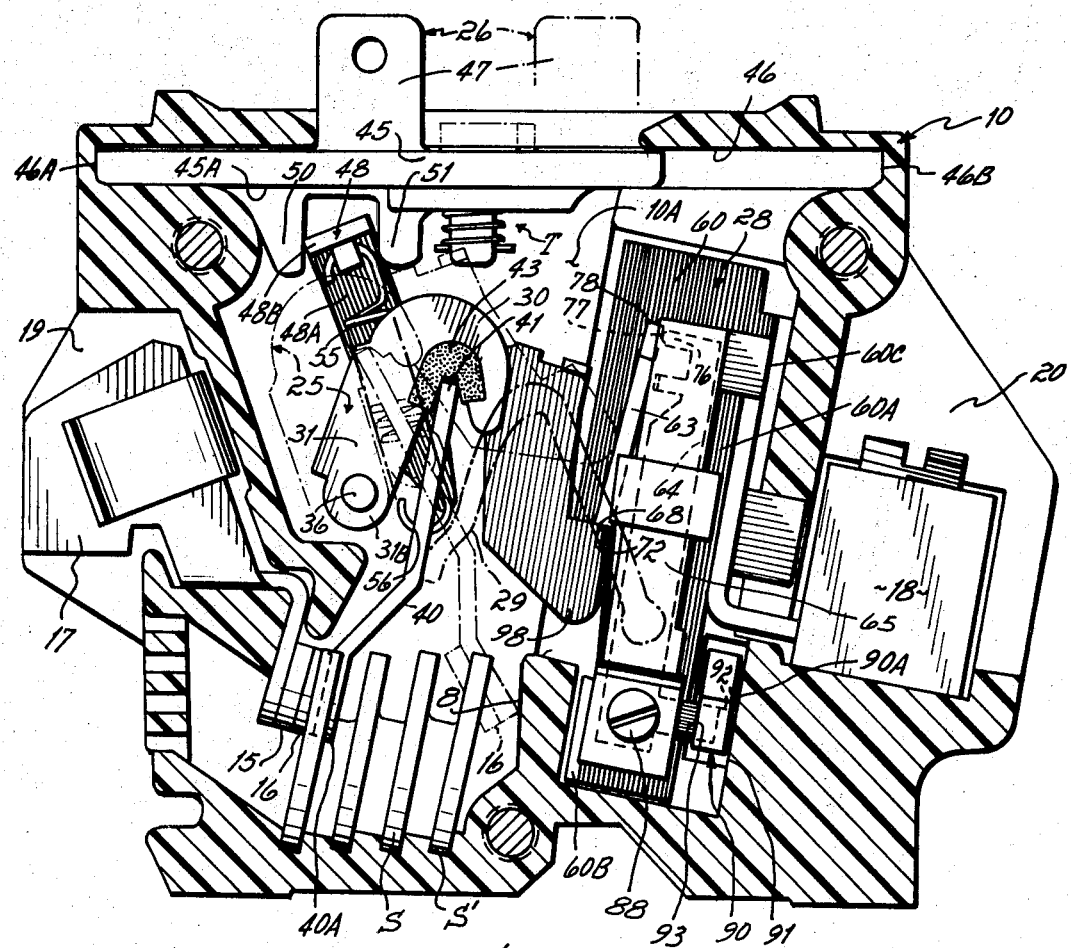
FIG. 6 is a cross-sectional view of the circuit breaker of this invention showing the operating elements in the closed untripped position.

As depicted in FIG. 6, the operating components of the circuit breaker enclosed within the housing 10 generally include fixed and movable contacts 15 and 16, respectively, electrically connected to line and load lugs or connectors 17 and 18, respectively, which are located and secured in external housing recesses 19 and 20, respectively. The circuit breaker further includes a spring-biased rocker or carrier assembly 25 which is selectively positionable between unlatched and latched positions, shown respectively in phantom and solid lines in FIG. 6, by a slideable manual actuator 26. With the rocker 25 in the latched position (solid lines), the movable contact 16 is selectively positionable between a closed position (see FIG. 1) and an open position (see FIG. 3). In the unlatched position (phantom lines), the rocker 25 is positioned such that the movable contact 16 is disconnected from the fixed contact 15.

Further included in the circuit breaker is a thermally and magnetically responsive tripping mechanism 28 which is series connected via a pigtail or flexible connector 29 with the movable contact 16. The tripping mechanism 28 selectively holds the carrier 25 in the latched position, shown in solid lines in FIG. 6, under non-overload conditions, and releases the carrier permitting it to return under the action of a bias spring to its unlatched position (phantom lines) for disconnecting the fixed and movable contacts 15 and 16 in response to an overload current flowing through the circuit breaker.

The circuit breaker is placed in the untripped condition by positioning the slidable actuator 26 in the phantom line position shown in FIG. 6. This positions the carrier 25 in the latched position, shown in solid lines in FIG. 6, where it is maintained by the tripping mechanism 28 with which it is engaged. With the carrier 25 in the set or untripped condition, the movable contact 16 may be selectively positioned in the closed and open positions depicted in FIGS. 1 and 3, respectively, by sliding the manual actuator 26 to the position shown in solid and phantom lines, respectively. Should an overload current condition develop, which can only occur when the circuit breaker is untripped and the movable contact 16 closed, the tripping mechanism is actuated, releasing the carrier 25, which then is free to return to the unlatched position (shown in phantom) under the action of a spring force. Return of the carrier 25 to the unlatched position pivots the movable contact 16 to an open-circuit position (phantom lines), thereby interrupting the series electrical path including the line and load connectors 17 and 18, the contacts 15 and 16, the pigtail 29, and the tripping mechanism 28.

Figure 4:
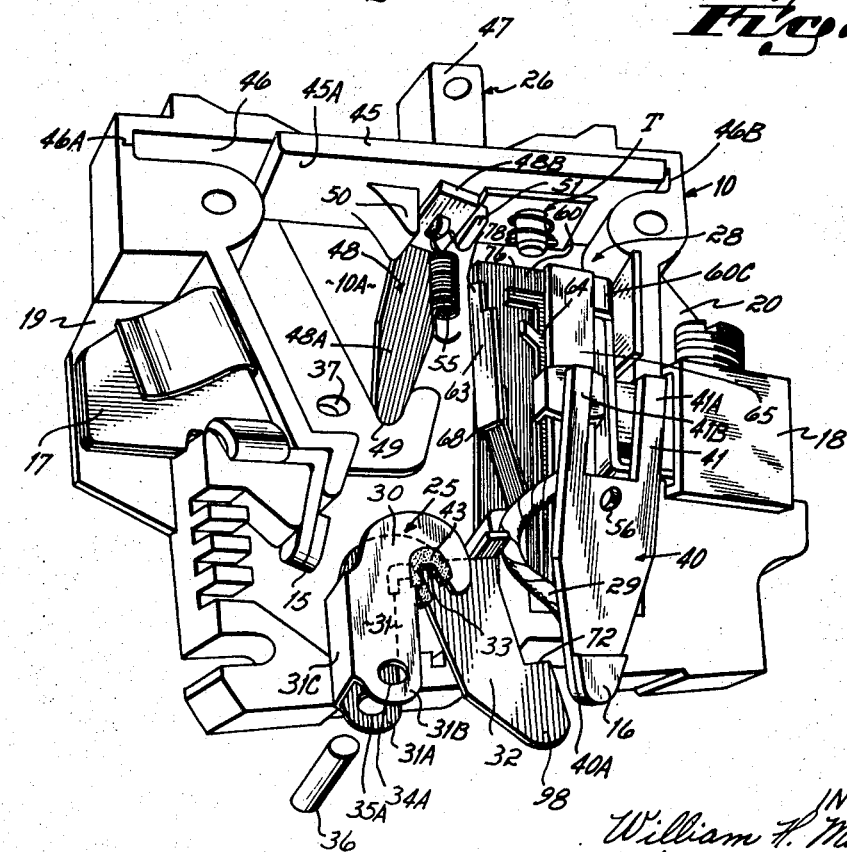
FIG. 4 is a partially exploded perspective elevational view of the circuit breaker of this invention.

The carrier or rocker assembly 25, considered in more detail, as best seen in FIG. 4, includes a bifurcated yoke 30 having angularly disposed arms 31 and 32 meeting to form a crotch 33. The carrier arm 31 is generally C-shaped having a side 31A and a side 31B joined by a central portion 31C. The ends of the sides 31A and 31B have apertures 34A and 35A enabling the yoke 30 to be pivotally mounted about a pin 36 which is transversely disposed between the mating sections of the housing 10 and which has its ends anchored in suitably positioned oppositely disposed blind holes 37 (one of which is shown in FIG. 4) formed in the interior wall 10A of the housing. The carrier or rocker assembly 25 further includes a movable contact supporting arm 40 having a lower free end 40A to which is securely fastened the movable contact 16, and an upper bifurcated end 41 having arms 41A and 41B adapted to pivotally interfit in an insulative insert 43 positioned in the crotch 33 of the yoke 30.

The slidable manual actuator 26 includes a substantially elongated flat plate 45 mounted for linear sliding movement between slot end 46A and 46B of a slot 46 formed in the housing 10. A lug 47 integral with the plate 45 and outwardly projecting therefrom is provided to enable the plate to be manually shifted in the slot 46. The actuator 26 further includes an L-shaped member 48 having a vertical arm 48A terminating in a crotch 49 formed integral with the interior surface 10A of the housing 10, and a horizontal arm 48B snugly positioned between depending shoulders 50 and 51 formed integral with the bottom surface 45A of the sliding plate 45. An over-center spring 55 connected between the underneath surface of a horizontal arm 48B and an intermediate portion 56 of the movable contact supporting arm 40 is provided to urge the bifurcated end 41 of arm 40 into the crotch 33 of the bifurcated yoke 30 for reasons to become evident hereinafter.

Figure 1:
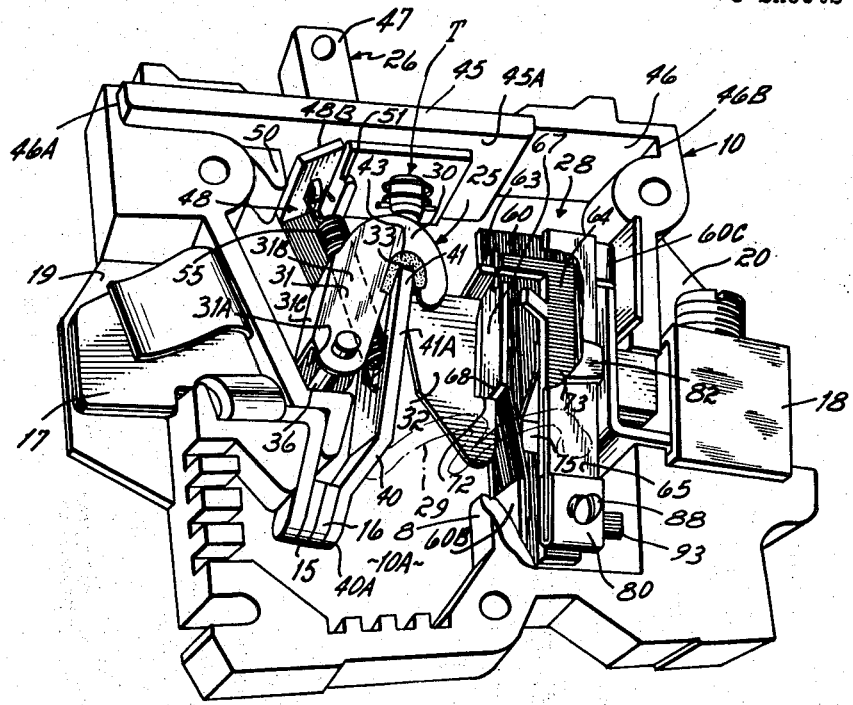
FIG. 1 is a perspective elevational view of the circuit breaker of this invention showing the operating elements in the closed untripped position.
Figure 3:
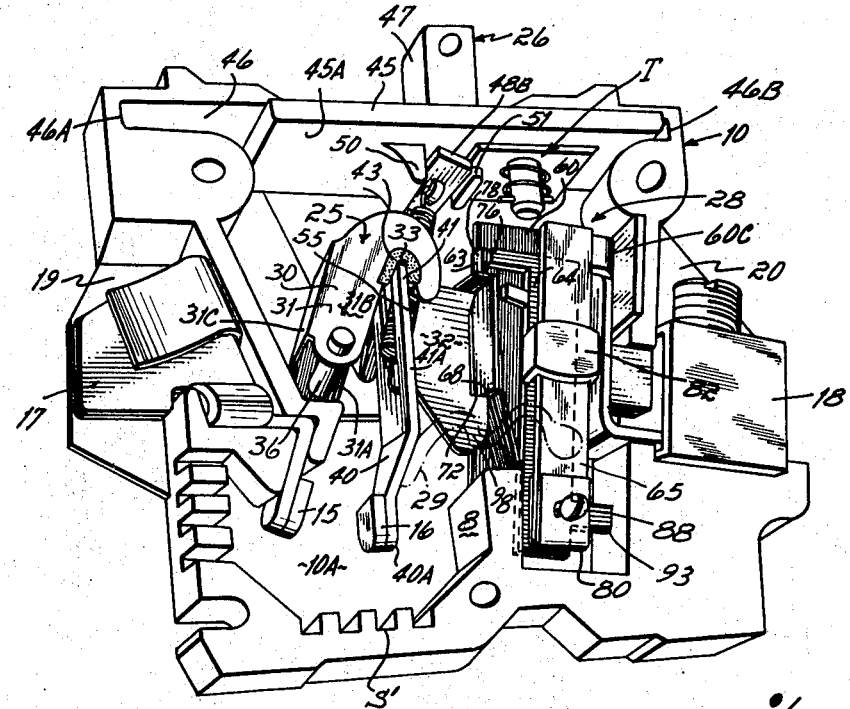
FIG. 3 is a perspective elevational view of the circuit breaker of this invention showing the operating elements in the open untripped position.

In operation, assuming the bifurcated pivotal yoke 30 is in a latched position shown in FIGS. 1, 3, and 6, sliding movement of the plate 45 between slot ends 46A and 46B is effective to pivot the L-shaped member 48 between the positions shown in FIGS. 1 and 6, and FIG. 3, respectively, corresponding to the closed and open position of the movable contact 16. Pivotal movement of the L-shaped member 48 between the closed and open position, respectively, shown in FIGS. 1 and 6 and FIG. 3 is effective, via the over-center spring 55, to pivot the arm 40 between the closed and open positions also shown in FIGS. 1 and 6, and FIG. 3, respectively, bringing the movable contact 16 into or out of electrical contact with the stationary contact 15, respectively, thereby completing or interrupting the series electrical path between the line and load connectors 17 and 18. Counterclockwise and clockwise pivotal movement of the arm 40 about its upper end 41 is limited by abutment of the arm 40 and yoke arm 32, and abutment of the fixed and movable contacts, respectiveily.

Figure 2:
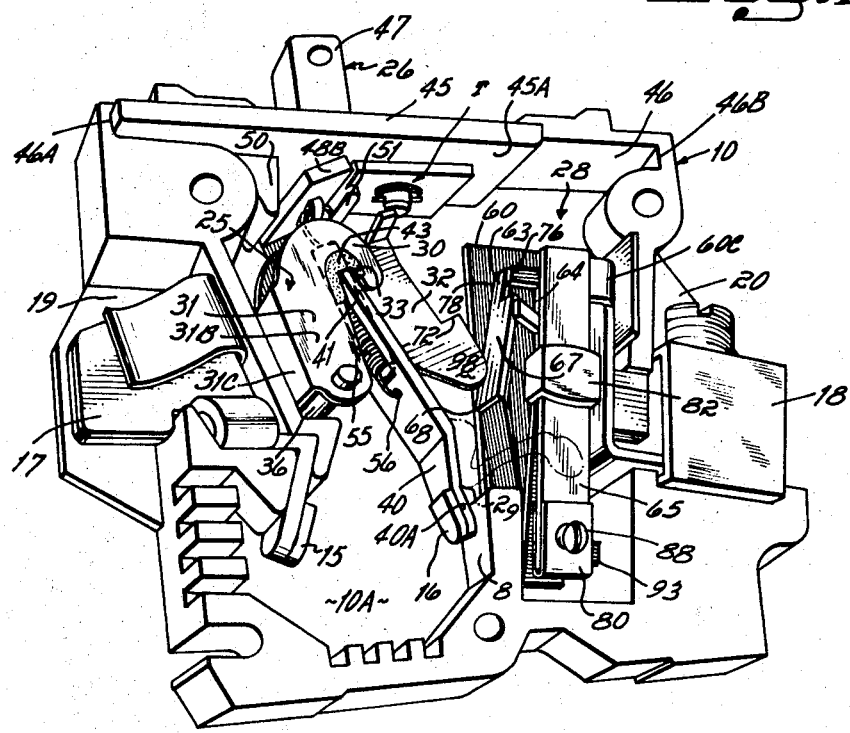
FIG. 2 is a perspective elevational view of the circuit breaker of this invention showing the operating elements in the open tripped position.

Should the bifurcated yoke 30 be in the unlatched position shown in FIG. 2, the actuator 26 is precluded from pivoting the movable contact supporting arm 40 so as to bring the movable contact 16 into electrical contact with the fixed contact 15. This results by reason of the mechanical interference which exists between the arms 41A and 41B and the sides 31A and 31B of the stably positioned rocker arm 31 which is angularly disposed to prevent clockwise pivotal motion of the arm 40 beyond the angular position shown in FIG. 2. In the unlatched condition of yoke 30, counterclockwise pivotal motion of the arm 40 is limited by abutment of its free end with the housing interior wall 8.

Figure 5:
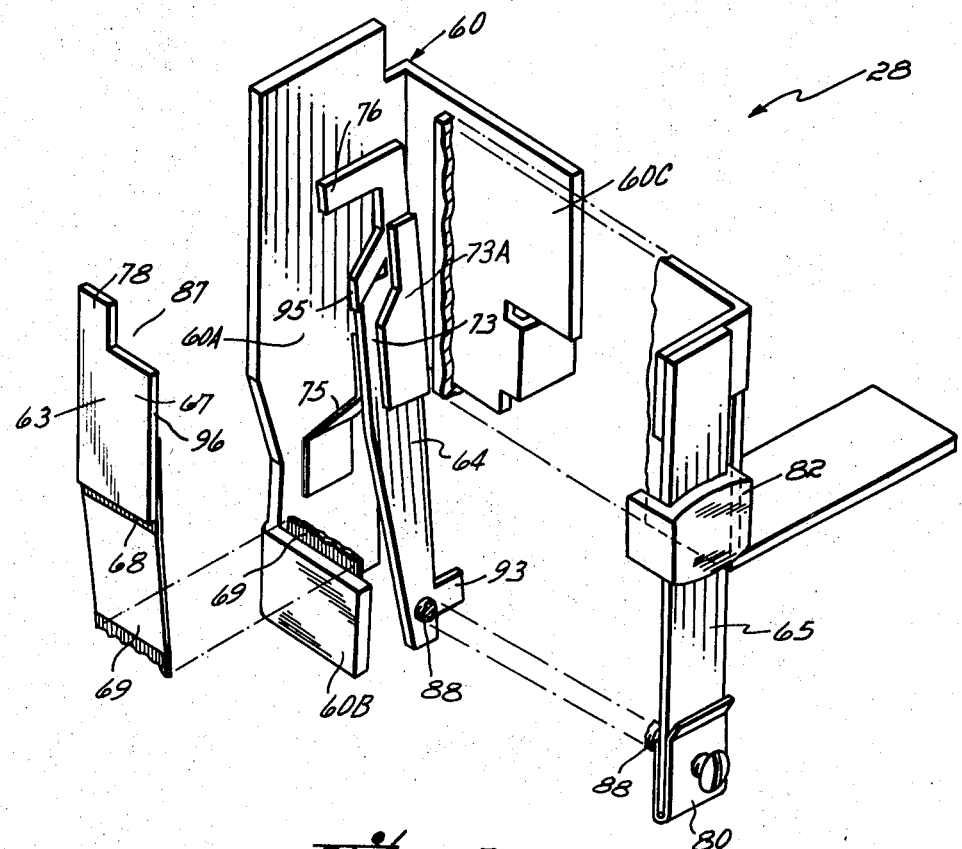
FIG. 5 is an exploded perspective view of the tripping mechanism of this invention.
Figure 7:
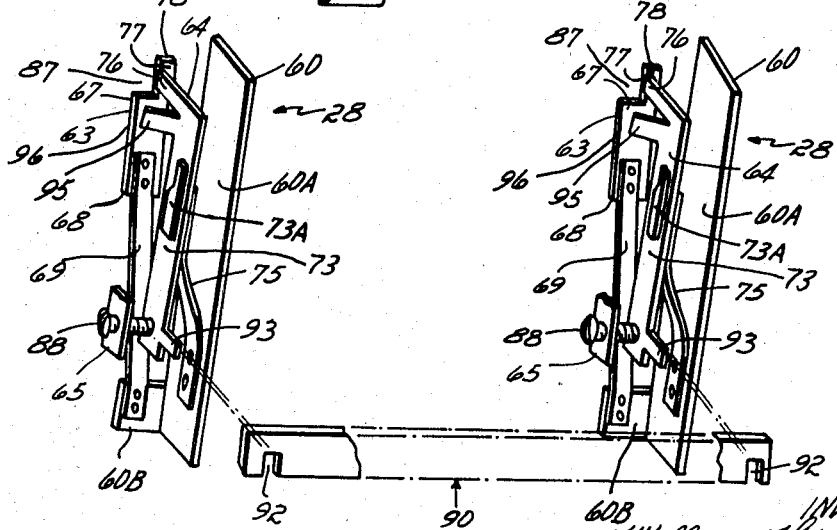
FIG. 7 is a perspective view of the tripping mechanisms of a plurality of single-pole circuit breakers showing the auxiliary latches mechanically interconnected by a common trip or gang bar to facilitate tripping all poles of a multipole circuit breaker when less than all of the single-pole circuit breakers are overloaded.

The tripping mechanism 28, considered in more detail as shown in FIGS. 5 and 7, is seen to include an elongated frame 60 having a central portion 60A adapted to seat against the interior wall 10A of the housing 10, an inner segment or ear 60B, and an outer segment or ear 60C. The elongated frame 60 functions to operatively mount in parallel a main latch 63, an auxiliary latch 64, and an overload current responsive member 65, thereby making the tripping mechanism 28 a self-contained compact unit which can be preset or calibrated by the manufacturer for subsequent insertion into the housing 10 in operative relation to the carrier assembly 25 to provide uniform tripping characteristics despite dimensional variation or instability of the housing 10.

The main latch 63 includes an upper elongated rigid member 67 and a lower flexible leaf spring member 69. The leaf spring member 69 is securely connected at its lower end to the ear 60B of the frame 60 and its upper end to the lower portion of the rigid member 67 and functions to resiliently mount the upper elongated rigid member 67 for pivotal movement between a latched or untripped position shown in FIG. 1 and an unlatched or tripped position shown in FIG. 2.

The upper elongated rigid member further includes an abutment 68 in the form of the lower end surface of the elongated rigid member 67. The abutment 68, when the main latch 63 is in the latched position shown in FIG. 1, is engageable with a cooperating shoulder 72 formed on the arm 32 of the pivotal yoke 30 when the latter is positioned in the latched position depicted in FIG. 1, thereby maintaining the yoke 30 in the latched position. With the yoke 30 in the latched position, the movable contact supporting arm 40 is selectively positionable between clockwise and counterclockwise pivotal positions by shifting the plate 45 between the left and right positions depicted in FIGS. 1 and 3, respectively, corresponding to the connected and disconnected circuit breaker contact positions, respectively.

The auxiliary latch 64 is elongated in shape and is mounted to the central portion 60A of the frame 60 by a leaf spring 75 secured at its lower end to the central frame portion 60A and at its upper end to an intermediate portion 73 of the auxiliary latch. The leaf spring 75 pivotally mounts the auxiliary latch 64 for movement about its intermediate portion 73 between untripped and tripped positions depicted in FIGS. 1 and 2, respectively.

The orientation of the auxiliary latch 64 relative to the main latch 63 is such that the auxiliary latch 64 moves transversely of the latch 63 toward and away from the housing side 10A. Thus, the axis about which the latches 63 and 64 pivot are perpendicular.

The auxiliary latch 64 includes at its upper end a stop 76. Stop 76, when the auxiliary latch is in the untripped position depicted in FIG. 1, is adapted to bear against the outer surface 77 of the upstanding ear 78 formed on the upper end of the elongated rigid member 67, holding the main latch 63 in the latched position, in turn, maintaining the yoke 30 in the latched position, thereby enabling the movable contact 16 to be selectvely connected and disconnected with the fixed contact 15 by actuation of the slidable manual actuator 45.

The overload current responsive member 65 is preferably elongated in shape, and has its upper end securely fastened to the segment or ear 60C. With the upper end of the overload current responsive member 65 securely fastened to the ear 60C, the lower or free end 80 is adapted to move from an untripped position (FIG. 1) to a tripped position (FIG. 2) when the member 65 bends in response to overload current flowing therethrough, the member 65 being, as indicated previously, series connected between the line and load connectors 17 and 18 via the ear 60C, the pigtail 29, the arm 40, and the movable and fixed contacts 16 and 15, respectively.

To enable the free end 80 of the overload current responsive member 65 to move from the untripped position to the tripped position, in response to sustained overloads as well as to instantaneous overloads, the overload current responsive member 65 preferably is fabricated of bimetallic material and mounts a magnetic yoke 82, providing the member 65 with both thermal and magnetic response characteristics. Yoke 82 is secured to an intermediate portion of the member 65 and cooperates with an oppositely disposed magnetic slug 73A mounted on the intermediate portion 73 of the auxiliary latch 64 to form, with the air gap therebetween, a complete magnetic circuit path.

If overload current exists for an extended predetermined time period, the Joulean or resistance heating effects of the overload current raise the temperature of the bimetallic member 65 to a tripped level. The bimetallic member 65, due to its differential thermal expansion characteristics, bends in a manner such that the free end 80 moves toward the lower end of the auxiliary latch 64 in an amount sufficient to pivot the auxiliary latch from the untripped to the tripped position. This displaces the stop 76 from a point behind the upstanding ear 78 to a laterally shifted position opposite a removed latch section 87 of the rigid member 67. With the stop 76 so positioned, the rigid member 67 of the main latch 63 is free to move to the unlatched position (FIG. 2), disengaging the abutment 68 and the shoulder 72, thereby permitting the bifurcated yoke 30 to return to its stable position and trip the circuit breaker. Once the circuit breaker is tripped and the fixed and movable contacts disconnected, current ceases to flow through the bimetal 65, allowing the bimetal to cool and return to its normal, unbent condition.

Higher magnitude overload currents of short duration flowing through the member 65 are also effective to bend the bimetal 65 and pivot the auxiliary latch, but do so by means of a different phenomenon. Specifically, instantaneous overload currents of higher magnitude produce intense magnetic fields in the magnetic circuit including the magnetic yoke 82, slug 73R mounted on the intermediate portion 73 of the auxiliary latch 64, and the air gaps therebetween. This magnetic field exerts attractive forces on the magnetic yoke 72 and the slug 73A tending to pull them together and thereby decrease the air gaps and, hence, the reluctance of the magnetic circuit. Since the auxiliary latch 64 is leaf-spring mounted, its intermediate slug-mounting portion moves toward the magnetic yoke 82, in turn, shifting the stop 76 to a position opposite the removed portion 87 of the main latch 63, which, in a manner described previously, causes the circuit breaker to be tripped.

Some heating of the bimetal 65 occurs in the course of tripping the circuit breaker magnetically as described in the foregoing paragraph. However, due to the instantaneous magnetic response of the tripping mechanism to higher magnitude overload currents, the circuit breaker trips, interrupting the current, before the bimetal heats sufficiently to bend to its tripping position by heating effects alone.

To adjust the level of overload current necessary to cause a given degree of motion of the free end 80 of the bimetallic member 65 to pivot the auxiliary latch 64 to the tripped position, adjustable force transmitting means are provided preferably in the form of a screw 88. The screw 88 threads into a suitably positioned opening formed in the free end 80 of the bimetallic member 65 to an adjustable depth. In operation, the depth to which the screw 88 is threaded determines the extent to which the stop 76 must be laterally shifted to permit the main latch 63 to unlatch. Increasing the depth to which the screw 88 is threaded decreases the amount by which the stop 76 must be shifted laterally to displace it from a position behind ear 78 to a position opposite removed portion 87, and hence, decreases the pivotal movement of the auxiliary latch 64 necessary to enable the main latch 63 to become unlatched.

Suitable arc snuffer plates S (FIG. 6) are fitted in slots S' formed in the housing interior to dissipate arcs between the fixed and movable contacts occasioned by completing or interrupting a circuit under loads conditions. A conventional trip indicator T of the general type embodied in circuit breaker model marketed by Wadsworth Electric Manufacturing Company, Inc. is provided to indicate the tripped or untripped condition of the breaker.

The circuit breaker of this invention has three principal operative positions; namely, an open tripped position, an open untripped position, and a closed untripped position, depicted respectively in FIGS. 2, 3, and 1.

When the circuit breaker is in the tripped position depicted in FIG. 2, the bifurcated yoke 30 is pivoted counterclockwise about pin 36 to its counterclockwise travel limit. With the yoke 30 so pivoted, the sides 31A and 31B of arm 31 are angled in a manner such that the movable arm 40 carrying the movable contact 16 is prevented, by mechanical interference between the arms 31 and 40, from positioning the movable contact 16 in electrical connection with the fixed contact 15. The yoke 30 is maintained in the position shown in FIG. 2 by the spring 55 which, via the arm 40, applies a counterclockwise moment, as viewed in FIG. 2, to the yoke 30 about the pin 36. Further counterclockwise motion of yoke 30 about pin 36 is prevented by abutment of a rearwardly extending ear (not shown) formed on the yoke with vertical portion 48A of the L-shaped member 48. The spring 55, after tripping has occurred, is in the position shown in FIG. 2 because the plate 45, in order for tripping to be possible, must be positioned in its leftmost position before tripping occurred to connect contacts 15 and 16 and enable an overload current to flow. The spring 55 also maintains the arm 40 in the position shown in FIG. 2 wherein it is fully opened and abutting the interior wall 8 of the housing which limits its counterclockwise travel.

In the tripped position in FIG. 2, the free end 98 of the yoke arm 32 abuts the member 67 holding the main latch 63 in its unlatched position and the auxiliary latch 64 in its tripped position.

In the untripped open position depicted in FIG. 3, the bifurcated yoke 30 is positioned in its maximum clockwise position and maintained in this position by the engagement of the shoulder 72 of the yoke arm 32 and the abutment 68 of main latch 63. The main latch 63 is maintained in the position shown in FIG. 3 by engagement of the stop 76 formed on auxiliary latch 64 and the outer surface 77 of ear 78 of main latch 63. The auxiliary latch 64 is free to assume the untripped position depicted in FIG. 3 due to the bimetal 65 being in the normal position, and is maintained in this position by the leaf spring 75.

The yoke 30, when in the position shown in FIG. 3, is biased counterclockwise about pin 36 since the spring 55, via the arm 40, applies a counterclockwise moment to the arm 30 about the pivot pin 36, tending to rotate the arm 30 counterclockwise to the tripped position depicted in FIG. 2. However, the yoke 30 is prevented from moving from the untripped position shown in FIG. 3 to the tripped position shown in FIG. 2 by engagement of the shoulder 72 and the abutment 68 of the main latch 63.

With the yoke 30 maintained in the latched position shown in FIG. 3, which corresponds to its maximum clockwise position, the movable arm 40 is free to assume the open position depicted in FIG. 3. In this position, the over-center spring 55, which has been moved to the position shown by positioning the plate 45 in its rightmost position, applies a counterclockwise moment to the arm 40 about its bifurcated end 41. This tends to rotate the arm 40 counterclockwise to the open position wherein the movable contact 16 is electrically disconnected from the fixed contact 15 and the electrical path between the line and load connectors 17 and 18 interrupted.

When the circuit breaker of this invention is in the closed untripped position depicted in FIG. 1, the bifurcated yoke 30 is in the same position as depicted in FIG. 3 and is maintained in this position in the same manner as discussed with respect to FIG. 3. However, the movable arm 40 is positioned in its maximum clockwise position as a consequence of moving plate 45 to its leftmost position. With the plate 45 in its leftmost position, the spring 55 applies a clockwise moment to the arm 40, tending to pivot the arm clockwise about its bifurcated end 41. With the arm 40 urged clockwise about its bifurcated end 41, the free end thereof carrying the movable contact 16 is urged toward the fixed contact 15, connecting the fixed and movable contacts and completing an electrical path between the line and load connectors 17 and 18.

With the circuit breaker untripped, that is, with the yoke 30 maintained in its clockwise position depicted in FIGS. 1 and 3 by engagement of the shoulder 72 and the abutment 68, the electrical path between the line and load connectors 17 and 18 can be switched between a closed position depicted in FIG. 1 and an open position depicted in FIG. 3 by moving the slide 45 between its leftmost position depicted in FIG. 1 and its rightmost position depicted in FIG. 3. Assuming the switch is in the untripped closed position depicted in FIG. 1 and it is desired to place the switch in the open untripped position depicted in FIG. 3, the upstanding lug 47 projecting from the upper surface of the slide 45 is urged rightwardly from the position shown in FIG. 1 to the position shown in FIG. 3. Urging of the slide 45 rightwardly urges the horizontal arm 48B of the L-shaped member 48 to the right pivoting the L-shaped member clockwise about the lower end of the vertical arm 48A which is pivotally positioned in the crotch 49. With the L-shaped member 48 pivoted clockwise the upper end of the spring 55 moves over center, applying a counterclockwise moment to the arm 40 tending to pivot it counterclockwise about its bifurcated end 41 which is free to move in the crotch insert 43. As the arm 40 moves about its bifurcated end 41 in a counterclockwise direction, the free end thereof moves rightwardly carrying with it the movable contact 16, thereby interrupting the circuit path between the fixed and movable contacts and, hence, between the line and load connectors 17 and 18.

If it is desired to transfer the circuit breaker from the open untripped position depicted in FIG. 3 to the closed untripped position depicted in FIG. 1, the upstanding lug 47 projecting from the upper surface of the shoulder 45 is urged leftwardly. Leftward movement of the plate 45, via the shoulder 51, urges the upper horizontal arm 48B leftwardly pivoting the L-shaped member 48 counterclockwise about its lower end which is free to move the crotch 49. Counterclockwise pivotal motion of the L-shaped member 48 causes the upper end of the spring 55 to move over center and apply a clockwise moment to the movable arm 40 tending to pivot it clockwise about its bifurcated end 41 which is free to move in the stationary crotch insert 43. The application to the arm 40 of a clockwise moment moves the free end thereof leftwardly urging the movable contact 16 into electrical contact with the fixed contact 15, completing a circuit between the line and load connectors 17 and 18.

The circuit breaker depicted in FIG. 1 is automatically tripped in response to either an instantaneous or a prolonged overload current through the series circuit including the line connector 17, the fixed contact 15, movable contact 16, arm 40, pigtail 29, bimetal 65, ear 60C and load connector 18. When tripped, the circuit breaker assumes the position depicted in FIG. 2 wherein the movable arm 40 is in its counterclockwise limit of travel and the movable contact 16 is disconnected from the fixed contact 15.

Assuming a prolonged overload current flows through the circuit breaker, the bimetal 65 is heated. Heating of the bimetal 65 causes it to bend, moving the free end 80 toward the lower end of the auxiliary latch 64. Movement of the bimetal end 80 is transmittedd by the screw 88 to the lower end of the auxiliary latch 64 causing the latter to pivot counterclockwise about its intermediate portion 73. Counterclockwise pivotal motion of the auxiliary latch 64 displaces the stop 76 formed on the upper end of the auxiliary latch 64 leftwardly to a position free of ear 78 opposite removed portion 87 of main latch 63.

When the stop 76 moves free of the ear 78, the main latch 63 moves in a clockwise direction about its lower end which is fixed to the ear 60B. Clockwise pivotal movement of the main latch 63 displaces the rigid member 67, disengaging the abutment 68 and the shoulder 72, which in turn, allows the latched bifurcated yoke 30 which is biased counterclockwise about the pin 36, to return to its unlatched position representing the tripped condition. Movement of the bifurcated yoke 30 counterclockwise from its latched position (FIG. 1) to its unlatched position (FIG. 2) is effective to urge the arm 40 counterclockwise about its bifurcated end 41 due to the mechanical interference between sides 31A and 31B of arm 31 and arm 40, disconnecting the contacts 15 and 16.

The foregoing description of the tripping of the circuit breaker of this invention, transferring the various operating elements of the breaker from the orientation depicted in FIG. 1 to the orientation depicted in FIG. 2, was discussed in connection with an overload current passing through the bimetal 65 for a duration sufficient to raise the temperature of the bimetal, causing it to bend and the free end 80 thereof to move toward the auxiliary latch 64. Tripping of the circuit breaker may also be produced in substantially the same manner as described in the foregoing paragraph by a sudden current surge exceeding a predetermined overload value, which surge does not last for a period sufficient to appreciably heat the bimetal 65.

Specifically, if the current flowing between the connectors 17 and 18 through the bimetal 65 suddenly increases, a large magnetic field is produced around the bimetal. The magnetic field is concentrated in the magnetic circuit which includes the yoke 82 and the cooperating slug 73A of the auxiliary latch 64. The slug-bearing intermediate portion 73 of the auxiliary latch 64 moves toward the yoke 82 to decrease the air gap therebetween and, hence, the reluctance of the magnetic circuit in a manner described previously. Movement of slug-bearing auxiliary latch 64 unlatches the latched main latch 63 which, in a manner also described previously, permits the counterclockwise biased yoke 30 to pivot counterclockwise about pin 36, moving the arm 40 away from the fixed contact 15, thereby interrupting the circuit between the connectors 17 and 18.

The circuit breaker of this invention, when in the tripped condition depicted in FIG. 2, can be placed in the open untripped condition shown in FIG. 3 by moving the slide 45 from the left position to the right position. Movement of the slide 45 to the right position (FIG. 3) applies a clockwise moment to the bifurcated yoke 30, rotating it clockwise from the position shown in FIG. 2 to the position shown in FIG. 3. With the yoke 30 so positioned, its shoulder 72 engages the abutment 68 of the main latch 63, the main latch 63 being biased toward the yoke 30 by the leaf spring member 69, and the yoke 30 is maintained in the untripped position.

Movement of the slide 45 to the right, in addition to pivoting the yoke 30 clockwise about the pin 36 to engage the abutment 68 and the shoulder 72 and thereby place the yoke 30 in the untripped position, is also effective to apply a counterclockwise moment to the arm 40, pivoting it counterclockwise about its upper end 41. With the movable arm 40 urged counterclockwise about its upper end 41, the free end 40A thereof is urged rightwardly, maintaining the movable contact 16 spaced and electrically disconnected from contact 15. Thus, the circuit breaker, in changing from a tripped condition to an untripped condition, does not complete the circuit path between the fixed and movable contacts 15 and 16.

Should it be desired to close the circuit breaker after it is reset, the upstanding lug 47 is urged leftwardly from the position shown in FIG. 3 to the position shown in FIG. 1. This is effective, in the manner described previously, to apply a clockwise moment to the movable arm 40, bringing the movable contact 16 in electrical contact with the fixed contact 15, thereby completing an electrical circuit between the line and load connectors 17 and 18.

Figure 8:
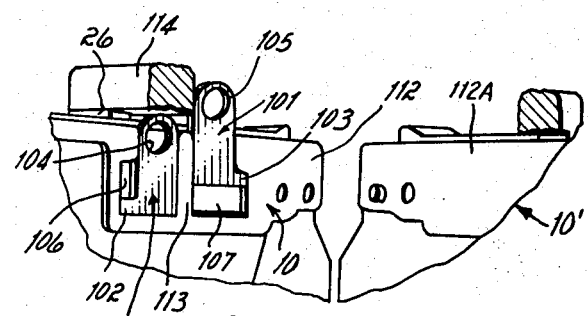
FIG. 8 is a partially exploded perspective elevational view of a multi-pole circuit breaker of this invention showing a circuit breaker lock.

A novel circuit breaker lock arrangement is also provided to permit the poles of a multi-pole circuit breaker to be locked in the ON or OFF position. The lock arrangement, which is depicted in FIG. 8, includes first and second identically configurated lock tabs 100 and 101. The tabs 100 and 101 have ears 102 and 103, respectively, horizontally extending from their lower extremities. The tabs 100 and 101 also have apertures 104 and 105, respectively, formed in their upper extremities. The locking arrangement further includes a pair of identical cavities 106 and 107 formed in the exterior side wall 112 of the circuit breaker housing 10 adjacent the wall 112A of the juxtaposed circuit breaker housing 10'. The cavities 106 and 107 are spaced by a separator 113 and are configured to permit limited vertical sliding movement of the tabs within their respective cavities between a down position, depicted by tab 100, and an up position depicted by tab 101. In the down position the top of the tab passes beneath or clears an actuating bar 114 secured to and rigidly connecting the actuators 26 of adjacent poles of the multi-pole circuit breaker. In the up position the top of the tab is positioned with its aperture in the path of travel of the actuating bar 114.

In operation, the actuating bar 114 is moved to either its left-hand or right-hand position to electrically connect or disconnect, respectively, the fixed and movable contacts, positioning the actuating bar 114 in overlying relationship with tab 100 or 101, respectively. Thereafter, the tab 100 or 101 which is not underlying the actuating bar 114 is elevated vertically to expose the aperture 105 or 104, respectively, and a suitable lock (not shown) engaged with the exposed aperture to prevent the elevated and engaged tab from moving downwardly. With the tab elevated and locked, the actuating bar 114 cannot be shifted to its alternate position to change the condition of the circuit breaker.

A multi-pole circuit breaker comprising a plurality of single-pole circuit breakers of this invention may be made in which all of the single-pole circuit breakers trip should one or more thereof be tripped by a current overload condition. Such a multi-pole circuit breaker is produced by mounting a plurality of the single-pole circuit breakers of this invention in juxtaposed or side-by-side aligned relationship and mechanically interconnecting their auxiliary latches 64 for simultaneous or ganged movement. Mechanical interconnection of the auxiliary latches 64 is preferably accomplished by utilization of an elongated gang or common trip bar 90 (FIG. 7) which is slidably mounted in suitably disposed apertures 91 (FIG. 6) formed in the housing one-half sections 10 of the juxtaposed single-poled circuit breakers.

The gang or common trip bar 90 is provided with a plurality of slots 92 which engage outwardly extending ears 93 projecting from the lower end of the auxiliary latches 64 when the common trip bar is properly positioned within the apertures 91. The slots 92 of the bar 90 are wider than the ears 93, providing a lost motion connection between the ear of an overloaded breaker and its associated slot. The width of the slot, and, hence, the extent of the lost motion connection, is selected such that the amount of movement of the ear 93 of an overload circuit breaker, produced by pivoting of the auxiliary latch to the extent necessary to disengage the main latch 63, is insufficient to impart movement to the gang bar 90. Stated differently, the width of slots 92 is sufficiently large to permit the auxiliary latch 64 of an overloaded circuit breaker to disengage before the ear 93 thereof transmits force to the bar 90. With the slot width so selected, the bimetal 65 of the overloaded pole does not have to develop the force necessary to shift the bar 90 and trip the remaining poles.

The lock bar 90 is operatively positioned by inserting it through the upper portion of the apertures 91. When the slots 92 are aligned with their associated ears 93, the bar drops to the lower portion of the apertures 91 and the ears 93 engage the slots 92. To prevent the bar 90 from riding up disengaging slots 92 and ears 93, a bar 90A (FIG. 6) is introduced into the upper portion of apertures 91 above the slotted bar 92, holding the slotted bar in its lower operative position.

To shift the gang or common trip bar 90 and thereby trip the non-overloaded single-pole circuit breakers of a multi-pole circuit breaker when one or more of the circuit breakers is subjected to an overload current, a cam follower ear 95 is formed on the upper end of each auxiliary latch 64. Cooperating with the cam follower ear 95 is a cam edge 96 formed on the rigid member 67 of the main latches 63.

In operation, when one of the poles of the multi-pole breaker is overloaded, its auxiliary latch 64 pivots, disengaging its associated main latch 63 permitting the main latch to unlatch. At this point the pivotal motion of the auxiliary latch 64, which has permitted disengagement of the main latch 63, has not shifted the bar 90 due to the lost motion connection between the ear 93 and the bar provided by the oversized slot 92.

When the main latch 63 of an overloaded circuit breaker of a multi-pole breaker is unlatched by counterclockwise pivoting of its auxiliary latch 64, as viewed in FIG. 7, its bifurcated yoke 30 is released and returned to its unlatched position under the action of the spring 55. In the course of returning to an unlatched position, the lower extremity 98 of the arm 32 of the overloaded breaker abuts its associated main latch 63, driving the upper elongated rigid member 67 toward the auxiliary latch 64. As the rigid member 67 is driven toward the auxiliary latch 64, the cam edge 96 cams against the cam follower ear 95, urging the upper end of the auxiliary latch 64 leftwardly, further pivoting the auxiliary latch counterclockwise as viewed in FIG. 7. This additional counterclockwise pivotal motion of the auxiliary latch 64 of the overloaded circuit breaker drives the gang bar 90 to the right, as viewed in FIG. 7. Movement of bar 90 pivots the auxiliary latches of the circuit breakers not subjected to an overload current an amount sufficient to unlatch their associated main latches 63, and trip the non-overloaded circuit breakers. Thus, the force necessary to move the auxiliary latches of the non-overloaded breakers is produced by the spring 55 of the overloaded breaker, and not by the bimetal 65 of the overloaded breaker.

The tripping mechanism of this invention provides a circuit breaker in which the spring bias of the rocker can be very large for the purpose of providing high contact pressure without appreciably altering the overload current level at which tripping occurs. The relative independence of overload current level and contact pressure is attributable to the manner in which the main latch 63, auxiliary latch 64, bimetal 65, and rocker 25 cooperate to isolate the spring force from the bimetal force.

Specifically, isolation of the spring force and bimetal force is achieved by mounting the auxiliary latch 64 for pivotal movement transverse to the pivotal movement of the main latch 63. This enables the auxiliary latch 64 to absorb or withstand major increases in spring force transmitted to the auxiliary latch via the carrier 25 and main latch 63 because the spring force is transmitted to the auxiliary latch 64 in a direction perpendicular to the direction of the pivotal motion of the auxiliary latch. With the spring force on the auxiliary latch 64 so directed, the spring bias can be increased substantially without significantly affecting the force which must be developed by the bimetal for tripping the auxiliary latch. Since the size of the spring force is correlated to contact pressure, the relative independence of the spring force and the bimetal force necessary to trip the auxiliary latch enables the contact pressure to be substantially increased without a significant increase in the bimetal force necessary to trip the auxiliary latch, and hence, in the overload current tripping level.

Isolation of the spring force and bimetal force is further enhanced by locating the point where the rocker 25 abuts the main latch 63 closely adjacent the main latch longitudinal axis. This causes the force of the spring 55, which is transmitted to the abutment 68 of the main latch via the rocker shoulder 72, to be directed substantially along the axis of the main latch. With the force of the spring 55 directed substantially axially of the main latch 63, only a very small component thereof is directed normal to the main latch in a direction tending to pivot it against auxiliary latch stop 76. With only a fraction of the spring force applied to the main latch being directed normal thereof, the spring force can be further increased with only a small increase in force between the main latch surface 77 and the auxiliary latch stop 76.

The desirability of isolating the spring and bimetal forces and having only a small force between the main latch surface 77 and the auxiliary latch stop 76 is apparent when it is appreciated that it is the force between surface 77 and stop 76 which determines the frictional drag between the latches 63 and 64, which drag must be overcome by the force developed by bimetal 65 under overload conditions. If the force between the main and auxiliary latches is too high, the drag is large and the bimetal fails to develop the necessary force to pivot the auxiliary latch at the desired overload level.

In practice, it has been found that this invention permits the use of extremely forceful springs to provide very large contact pressures without significantly increasing the normal force between the main latch surface 77 and the auxiliary latch stop 76. Hence, the frictional drag between the latches 63 and 64 is not increased to a point where the force generated by the bimetal under overload conditions is insufficient to pivot the auxiliary latch and thereby trip the circuit breaker.

The tripping mechanism 28 of this invention, because of the unique arrangement and co-action of the main latch 63, auxiliary latch 64 and the bimetal 65, provides an assembly which is extremely compact. The parallel disposition of the latches and bimetals 63–65 enables the tripping mechanism to be shorter and thinner than would otherwise result if the latches and the bimetal were differently disposed, such as, end-to-end or orthogonally.

A further advantage of the circuit breaker of this invention is that the tripping level is substantially independent and insensitive to dimensional variation and instability of the housing in which the tripping mechanism 28 is mounted. Since the latches 63 and 64 and the bimetal 65 are mounted on the frame 60, and further, since the force applied to the abutment 68 by the shoulder 72 is substantially axial, dimensional variations in the housing which would cause the shoulder 72 to engage the abutment to a greater or lesser extent depending on whether the housing contracts or expands is inefficient to vary the tripping level of the mechanism 28 established by the settling of the screw 88.

For example, if the dimensions of the housing 10 vary such that the shoulder 72 engages the abutment 68 only very slightly, the change in normal force between the main latch surface 77 and the auxiliary latch stop 76, which establishes the frictional drag which must be overcome by the bimetal 65 to trip the circuit breaker, it not appreciably changed from the size of the normal force under conditions wherein the shoulder 72 and the abument 68 engage to the maximum extent possible. Likewise, should the engagement between the shoulder 72 and the abutment 68 be greater than normal due to dimensional variations in the housing, the normal force between the main latch surface 77 and the auxiliary latch stop 76, and hence, the frictional drag therebetween, is not appreciably changed from the case wherein the abutment and shoulder engage only slightly. Thus, the circuit breaker of this invention, by reason of the unobvious tripping mechanism incorporated therein, is capable of being factory calibrated for tripping at a preset overload current, which calibration is independent of dimensional variations of the housing in which the tripping mechanism is mounted.

A further advantage of this invention, attributable to having the bimetal move in a direction perpendicular to the movable contact, is that the pigtail can have a large cross-section, allowing cooler operation at high currents, without interfering with the bimetal deflection. Ordinarily, large cross-section pigtails are avoided because their stiffness interferes with proper bimetal operation. However, with the structure of this invention, this problem is overcome.

To provide ambient temperature compensation, the circuit breaker of this invention may be modified to the extent of fabricating the auxiliary latch 64 in whole or in part of bimetallic material. With the auxiliary latch 64 fabricated of bimetallic material, changes in ambient temperature cause the bimetallic auxiliary latch to bend, laterally shifting the stop 76 relative to the upstanding ear 78. Movement of the stop 76 relative to the ear 78 alters the amount by which the auxiliary latch must be shifted by the bimetal 65 to effect tripping in response to any given overload current in the bimetal, the amount altered being greater for larger variations in temperature. Thus, by fabricating the auxiliary latch 64 of bimetallic material, an ambient temperature compensated circuit breaker is provided.

If desired, the bimetal 65 may be eliminated entirely and the auxiliary latch 64 constructed of bimetallic material. With such an arrangement, the pigtail 29 is connected to permit the current through the circuit breaker to pass through the auxiliary latch. In operation, when the current through the auxiliary latch reaches the overload level, the bimetallic auxiliary latch bends sufficiently to displace the stop 76 from behind the ear 68 to a position opposite the main latch removed portion 87, unlatching the main latch and tripping the circuit breaker.

Depicted in FIGS. 9–12 is a tripping mechanism 128 constituting an alternative tripping mechanism embodiment with respect to the tripping mechanism 28 of FIGS.

1–7, and one which can be directly substituted for the tripping mechanism 28 in the circuit breaker depicted in FIGS. 1–8. When so substituted, the tripping mechanism 128 co-acts with the remaining elements of the circuit breaker of FIGS. 1–8 in the same manner as the tripping mechanism 28. Since the co-action is the same, the description of the alternative tripping mechanism embodiment 128 is confined solely to its structural and operational features and not to those of the circuit breaker with which it can be utilized.

The tripping mechanism 128, considered in more detail and with reference to FIGS. 9–12, is seen to include an elongated frame 160 having a central section 160A adapted to seat against the interior wall 10A of the housing 10, an inner section 160B, and an outer section 160C. Fixedly secured to the outer section 160C is an angulated section 160D, preferably fabricated of copper, which has formed integral with it an electrical terminal 160E. The elongated frame 160 and associated section 160D function to operatively mount in generally parallel relation a main latch 163, an auxiliary latch 164, a thermally activated overload current responsive member 165, and a magnetically activated overload current responsive member 166. The tripping mechanism 128 is a self-contained compact unit which can be preset or calibrated by the manufacturer for subsequent insertion into the housing 10 in operative relation to the carrier assembly 25 to provide uniform tripping characteristics despite dimensional variation or instability of the housing 10.

The main latch 163 includes an upper elongated rigid member 167 having an angulated or offset intermediate section 167A, and a lower flexible leaf spring member 169. The leaf spring member 169 is securely connected at its lower end to the section 160B of the frame 160 and at its upper end to the lower portion of the rigid member 167. The spring 169 functions to resiliently mount the upper elongated rigid member 167 for pivotal movement between a latched or untripped position which is similar to the position of the rigid member 67 of FIG. 1, and an unlatched or tripped position which is similar to the position of rigid member 67 in FIG. 2.

The upper elongated rigid member 167 further includes an abutment 168 in the form of an upper edge of an aperture 168A formed in the offset or angulated intermediate section 167A of the rigid member 167. The abutment 168, when the main latch 163 is in the latched position similar to the position of the main latch 63 shown in FIG. 1, is engageable with a cooperating shoulder 72 formed on the arm 32 of the pivotal yoke 30 when the latter is positioned in the latched position depicted in FIG. 1, thereby maintaining the yoke 30 in the latched position. With the yoke 30 in the latched position, the movable contact supporting arm 40 is selectively positionable between clockwise and counterclockwise pivotal positions by shifting the plate 45 between the left and right positions depicted in FIGS. 1 and 3, respectively, corresponding to the connecting and disconnecting circuit breaker contact positions, respectively.

The abutment 168, when the main latch 163 moves to its tripped position corresponding to the position of the main latch 63 shown in FIG. 2, disengages or releases the cooperating shoulder 72 formed on the arm 32 of the pivotal yoke 30, thereby permitting the yoke 30 to move to and remain in the tripped position shown in FIG. 2. With the yoke 30 in the tripped position, the movable contact 16 is not in electrical contact with the fixed contact 15, corresponding to the tripped circuit breaker condition.

The auxiliary latch 164 is elongated in shape and is mounted to the section 160C of the frame 160 by a horizontal pivot pin 170 whose one end is staked or otherwise permanently fastened to the composite section 160C of the frame 160. The pin 170 is provided with a flange 170A and a spacing washer 170B to properly locate the auxiliary latch 164 on the shaft 170 relative to the remaining elements of the tripping mechanism 128. A band 164A having a curved central portion is secured to the intermediate portion of the auxiliary latch 164 by any suitable means, such as spot welding, and establishes with the central portion of the auxiliary latch 164, a bore in which the portion of the pin 170 between the flange 170A and spacing washer 170B is received to pivotally mount the auxiliary latch 164 about the pin 170 for movement between the untripped and tripped positions shown in FIG. 10 and FIGS. 11 and 12, respectively.

The orientation of the auxiliary latch 164 relative to the main latch 163 in addition to being generally parallel, is also such that the auxiliary latch 164 moves in a plane perpendicular to the plane in which the latch 163 moves, that is, the auxiliary latch 164 moves toward and away from the housing side 10A. Thus, the axis about which the main and auxiliary latches 163 and 164 pivot are generally perpendicular.

A leaf spring 171, which has its upper end permanently fastened to the central section 160A of the frame 160 and its lower end bearing against the lower end of the auxiliary latch 164, is provided to bias the auxiliary latch 164 to the untripped position depicted in FIG. 10.

In the tripping mechanism 128 the means for pivotally mounting the auxiliary latch 164, such as the pivot pin 170, is structurally independent of the means for biasing the auxiliary latch 164 to its untripped position, such as the leaf spring 171. This is in contrast to the tripping mechanism 28 wherein a dual purpose element such as the leaf spring 75 is employed for both biasing and pivotally mounting the auxiliary latch. Two very important advantages result by virtue of the use of pivot mounting means for the auxiliary latch 164 which are independent of the biasing means.

First, the axis about which the auxiliary latch 164 pivots is positively and fixedly located in space relative to the other elements of the tripping mechanism 128. This makes for more reproducible results and reliable operation. Manufacturing tolerances are easier to maintain, and calibration does not vary. Also, by knowing the exact location of the axis about which the auxiliary latch 164 pivots, precise calculations can be made of the different forces acting on the various elements of the tripping mechanism 128 making the results of a design more predictable.

Secondly, by separating the pivotal mounting means for the latch 164 of tripping mechanism 128 and the spring bias means 171, the stiffness of the bias spring can be reduced relative to that of the combined bias and mounting spring 75 of the tripping mechanism 28. Heretofore, to prevent the upper end of the auxiliary latch 64 from moving toward frame portion 60C due to the force applied by the main spring 55 through the yoke 30 and main latch 63 when the breaker is in the "ON" position, it has been the practice to stiffen the spring 75 over and above that necessary to bias the auxiliary latch to its untripped position. This has resulted in the need to have the bimetal 65 generate unnecessarily large forces to effect tripping. With the present construction, wherein the pivot 170 and bias spring 171 are independent, the bias force can be reduced without affecting the ability of the pivot 170 to prevent movement of the upper end of the auxiliary latch toward the frame section 160C.

The auxiliary latch 164 includes at its upper end a stop 176. The stop 176, when the auxiliary latch is in the untripped position depicted in FIG. 10, is adapted to bear against the outer surface 177 of the upstanding ear 178 formed on the upper end of the elongated rigid member 167 of main latch 163. This holds the main latch 163 in the latched position, in turn, maintaining the yoke 30 in the latched position, thereby enabling the movable contact 16 to be selectively connected and disconnected with the fixed contact 15 by actuation of the slideable manual actuator 45.

The thermally activated overload current responsive member 165 is preferably elongated in shape and has its upper end securely fastened to the terminal-mounting section 160D. With the upper end of the thermally activated overload current responsive member 165 so fastened, the lower or free end 180 therof is adapted to move from the untripped position (FIG. 10) to the tripped position (FIG. 11) when the member 165 bends in response to a sustained overload current of relatively low value flowing therethrough, the member 165 being series connected between the line and load connector 17 and 18 via the terminal-mounting section 160D, the pig-tail 29, the arm 40, and the moveable and fixed contact 16 and 15, respectively.

To enable the free end 180 of the thermally activated overload current responsive member 165 to move from the untripped position to the tripped position in response to sustained overload currents of relatively low value, member 165 preferably is fabricated of bimetallic material. If a relatively low overload current exists for an extended predetermined time period, the Joulean or resistance heating effects of the overload current raise the temperature of the bimetallic member 165 to a trip level. The bimetallic member 165, due to its differential thermal expansion characteristics, bends in a manner such that the free end 180 thereof moves toward the lower end of the auxiliary latch 164 an amount sufficient to pivot the auxiliary latch from the untripped to the tripped position. This displaces the stop 176 from a point behind the upstanding ear 178 to a laterally shifted position opposite a removed latch section 187 of the rigid member 167. With the stop 176 so positioned, the rigid member 167 of the main latch 163 is free to move to the unlatched position (FIG. 11) from the latched position (FIG. 10), disengaging the abutment 168 and the shoulder 72, thereby permitting the bifurcated yoke 30 to return to its stable position and trip the circuit breaker. Once the circuit breaker is tripped and the fixed and movable contacts disconnected, current ceases to flow through the bimetallic member 165, allowing the bimetallic member to cool and return to its normal, unbent condition shown in FIG. 10.

To enable the tripping mechanism 128 to respond instantaneously to overload currents of relatively high level a yoke 182 is provided in combination with the magnetically activated member 166. The yoke 182, considered in more detail, includes a central portion 182B secured at its upper extremity to the terminal mounting section 160D via the upper end of the bimetallic member 165. The yoke 182 also includes side sections 182C and 182D which extend perpendicularly therefrom.

The magnetically activated member 166 is preferably elongated in shape and has extending from its intermediate section 166A oppositely projecting pivot arms 166B and 166C which seat in apertures 183B and 183C formed in yoke side sections 182B and 182C, respectively. The pivot arms 166B and 166C, and cooperating apertures 183B and 183C, function to pivotally mount the elongated member 166 about an axis substantially parallel to the axis of the pin 170 about which the auxiliary latch 164 pivots.

The member 166 also includes an upper section 166D and a lower section 166E. The upper section 166D is spaced approximately in alignment with the midsection of the central yoke section 182B. The lower section 166E of the member 166 is dimensioned such that its lower end bears against the lower end of the auxiliary latch 164, pivoting the latter from the untripped position shown in FIG. 10 to the tripped position shown in FIG. 12 in response to an instantaneous overload current of relatively high value. Under non-overload conditions with the member 166 pivotally mounted by the yoke sections 182B and 182C, the lower end 166E of the member 166 is urged to its rightmost position, as shown in FIG. 10, by the lower end of the auxiliary latch 164 which in turn is biased by the leaf spring 171.

When a short duration, relatively high level overload current flows through the bimetallic member 165, an intense magnetic field is created inducing a large magnetic flux flow in a magnetic circuit path comprising the upper portion 166D of the member 166, the yoke 182, and the air gaps therebetween. This intense magnetic field and the resultant flux exerts attractive forces between the upper section 166D of member 166 and the yoke 182, which tend to pull them together and thereby decrease the total air gap therebetween and hence the reluctance of the magnetic circuit path. Since the upper section 166D of the member 166 is free to move and the magnetic yoke 182 is not, the section 166D moves, causing the member 166 to pivot about its arms 166B and 166C. Pivotal movement of the member 166 causes the lower section 166E of the member 166 to move from the position shown in FIG. 10 to the position shown in FIG. 12, in turn pivoting the auxiliary latch 164 clockwise about its pivot pin 170 as viewed in FIG. 12. Pivotal movement of the auxiliary latch 164 to the position shown in FIG. 12 shifts the stop 176 to a position opposite the removed portion 187 of the main latch 163 which, in the manner described previously, causes the circuit breaker to be tripped.

The force developed by the instantaneous and relatively high overload current is located in the region of the yoke 182 and hence is opposite the pivot axis of the auxiliary latch 164 defined by pin 170. If this force were to be used to move the auxiliary latch 164 directly, that is without use of the pivotal member 166, the magnitude of the magnetic force developed by the overload current would have to be quite large since the moment arm between the pivot pin 170 and the point on section 166D where the magnetic force is applied is quite small. By virtue of the pivotal member 166, the force level necessary to pivot the auxiliary latch 164 in response to an instantaneous overload current of relatively high level can be substantially reduced. Specifically, the member 166 provides a mechanical advantage due to the fact that the distance between pin 170 and the point where the section 166E contacts the auxiliary latch is greater than the distance between the pin 170 and the point where the magnetic force would be applied to the auxiliary latch 164 were the member 166 omitted.

To adjust the level of overload current necessary to cause a given degree of motion of the free end 180 of the bimetallic member 165 to pivot the auxiliary latch 164 to the tripped position, adjustable force transmitting means are provided preferably in the form of a screw 188. The screw 188 performs for the tripping mechanism 128 the same function as the screw 88 performs for the tripping mechanism 28.

Having described the invention, what is claimed is:

1. In a circuit breaker having a housing, a stationary contact fixed to said housing, and a carrier movably mounted to said housing for movement between unlatched and latched positions wherein a movable contact carried by said carrier is alternatively electrically disconnected and selectively connectable with said stationary contact, respectively, and a spring biasing said carrier to said unlatched position, the improvement comprising:

an overload current responsive member electrically connected in series with said fixed and movable contacts and movable from a non-overload position to an overload position in response to an overload current through said member;

a movable main latch mounted at a first point to said housing for movement in a first plane between a latched position wherein said main latch engages and maintains said carrier in its latched position thereby enabling said fixed and movable contacts to be selectively connected, and an unlatched position wherein said carrier is free to return under the action of said spring to its unlatched position to electrically disconnect said fixed and movable contacts; and a movable auxiliary latch mounted to said housing at a second point for movement in a second plane substantially perpendicular to said first plane, in response to movement of said overload member upon occurrence of an overload, from a non-tripped position wherein said auxiliary latch engages said main latch at a common point and maintains said main latch and carrier in their latched positions, to a tripped position wherein said main latch is free to move to its unlatched position and permit said carrier to return to its unlatched position to disconnect said fixed and movable contacts, said auxiliary and main latches being further configured and oriented such that a first imaginary line connecting said first point where said main latch is mounted to said housing and said common point where said main latch engages said auxiliary latch is substantially parallel to a second imaginary line connecting said second point where said auxiliary latch is mounted to said housing and said common point where said auxiliary latch engages said latch, thereby providing a compact resettable circuit breaker.

2. The improvement of claim 1 further including a frame fixed to said housing and movably mounting said main and auxiliary latches and said overload current responsive member for operatively interconnecting said main latch and said carrier independent of random dimensional variations in said housing giving rise to random variations in orientation of said carrier and main latch when said carrier is latched by said main latch, thereby enabling the overload current level at which said main latch and said carrier become unlatched to be constant independent of the housing in which said frame-mounted latches and member are positioned in use.

3. The improvement of claim 1 wherein said main latch is elongated and pivotally mounted to said housing at said first point for pivotal movement in said first plane and includes an abutment engageable by said latched carrier for urging said main latch substantially axially whereby the force between said main latch and said perpendicularly movable auxiliary latch in said latched and untripped positions, respectively, produced by the spring bias applied through said carrier to said main latch, is insignificant relative to the force between said abutment and carrier produced by said spring bias applied through said carrier, thereby enabling the contact pressure to be substantially increased without appreciably affecting the force developed by said overload responsive member necessary to move said auxiliary latch to said tripped position.

4. The improvement of claim 2 wherein said auxiliary latch is pivotally mounted to said housing at said second point for movement in said second plane perpendicularly to said pivotal movement of said main latch in said first plane, and further including adjustable force transmitting means positioned between the free end of said auxiliary latch and said overload member for adjusting the motion of said overload member necessary to pivot said auxiliary latch to said tripped position and thereby adjusting the overload current level necessary to unlatch said main latch and carrier and disconnect said fixed and movable contacts.

5. The circuit breaker of claim 1 wherein
said auxiliary latch is elongated and mounted for pivotal motion about a fixed position axis perpendicularly disposed relative to said second plane, and wherein said overload current responsive member includes a magnetically responsive device having:
(a) a stationary element mounted to said housing and in which magnetic flux is inducted by an overload current, and
(b) a lever mounted to said housing for pivotal motion about a second axis parallel to said fixed position auxiliary latch axis, said lever having a first movable section spaced from said stationary element in the absence of an overload current which is adapted to move toward said stationary element in response to an overload current to cause said lever to pivot about said axis, said lever having a second movable section adapted to contact said auxiliary latch at a specified point to pivot said axial latch about its axis to said tripped position in response to pivotal movement of said lever caused by overload current induced movement of said first movable section.

6. The circuit breaker of claim 5 wherein said second axis is located intermediate said first and second movable sections, and wherein said fixed position auxiliary latch axis is located intermediate said common point and said specified point.

7. The circuit breaker of claim 5 further including a spring connected between said housing and said auxiliary latch for biasing said auxiliary latch to said non-tripped position, said spring being inoperative to also mount said auxiliary latch to said housing thereby enabling said spring to function independently of the pivotal mounting of said auxiliary latch.

8. In a multi-pole circuit breaker having a plurality of juxtaposed stationary contacts, a plurality of juxtaposed spring-biased carriers movably mounted for movement between unlatched positions and latched positions wherein movable contacts carried by said carriers are alternatively electrically disconnected and selectively connectable, respectively, with their associated stationary contacts, the improvement comprising:
a plurality of tripping mechanisms each including:
(a) a housing;
(b) an overload current responsive member electrically connected in series with said fixed and movable contacts and mounted to said housing for movement from a non-overload position to an overload position in response to an overload current through said member;
(c) a movable main latch mounted to said housing at a first point for movement in a first plane between a latched position wherein said main latch engages and maintains said carrier in its latched position thereby enabling said fixed and movable contacts to be selectively connected, and an unlatched position wherein said carrier is free to return under the action of said spring to its unlatched position to electrically disconnect said fixed and movable contacts; and
(d) a movable auxiliary latch mounted to said housing at a second point for movement in a second plane substantially perpendicularly to said first plane in response to movement of said overload member upon occurrence of overload, from a non-tripped position wherein said auxiliary latch engages said main latch at a common point and maintains said main latch and said carrier in their latched positions, to a tripped position wherein said main latch is free to move to its unlatched position and permit said carrier to return to its unlatched position to disconnect said fixed and movable contacts;
said auxiliary and said latches being further configured and oriented such that a first imaginary line connecting said first point where said main latch is mounted to said housing and said common point where said main latch engages said auxiliary latch is substantially parallel to a second imaginary line connecting said second point where said auxiliary latch is mounted to said housing and said common point where said auxiliary latch engages said latch, thereby providing a compact resettable circuit breaker; and
gang means mechanically interconnecting said auxiliary latches for moving, in response to tripping of one of asid plurality of auxiliary latches, the remaining untripped auxiliary latches to their respective tripped positions, thereby insuring the disconnection of all of said movable and fixed contacts should one pole of the circuit breaker be subjected to an overload current, said gang means being connected to each of said auxiliary latches and movable by any one of said auxiliary latches in a direction perpendicular to said first planes in which said main latch move.

9. The improvement of claim 8 wherein said main and auxiliary latches are pivotally mounted to said housing at said first and second points, respectively, for pivotal movement in said second plane perpendicularly to said main latch in said first plane, and wherein said main latches include cams cooperable with cam followers on their associated auxiliary latches for pivoting said associated auxiliary latches in said second planes beyond the position to which said auxiliary latches are pivoted by their associated overload members.

10. The improvement of claim 9 wherein said gang means is a bar having means to provide a limited lost motion connection between said auxiliary latches and said bar for permitting an auxiliary latch of an overloaded pole to unlatch its associated main latch without applying force to said bar.

11. The improvement of claim 10 wherein said bar has a plurality of slots engageable with said auxiliary latches, said slots being oversized to permit lost motion between said bar and said auxiliary latches.

12. A circuit breaker comprising:
a housing;
a stationary contact fixed to said housing;
a spring-biased carrier movably mounted to said housing for movement between unlatched and latched positions wherein a movable contact carrier by said carrier is alternatively electrically disconnected and selectively connectable with said stationary contact, respectively;
a frame mounted in said housing;
an overload current responsive member electrically connected in series with said fixed and movable contacts, said member mounted to said frame and movable transversely of said movable contact from a non-overload position to an overload position in response to an overload current through said member;
an elongated main latch having an abutment, said main latch being pivotally mounted to frame for pivotal movement between a latched condition wherein said carrier is in its latched position thereby enabling said fixed and movable contacts to be selectively connected, and an unlatched condition wherein said carrier is free to return under the action of said spring to its unlatched position to electrically disconnect said fixed and movable contacts; and
an elongated auxiliary latch disposed substantially parallel to said main latch, said auxiliary being pivotally mounted to said frame and pivotable in a plane substantially perpendicular to the plane in which said main latch pivots, in response to movement of said overload member upon occurrence of said overload, from a non-tripped position, wherein said auxiliary latch maintains said main latch and said carrier in their latched positions, and wherein said latched carrier urges said auxiliary latch substantially axially rendering the normal component of force exerted by said carrier on said auxiliary latch substantially smaller than the axial component thereof, to a tripped position, wherein said main latch is free to move to its unlatched position and permit said carrier to return to its unlatched position to disconnect said fixed and movable contacts, whereby the overload current level at which said main latch and said carrier become unlatched is substantially constant independent of the contact pressure developed by said spring random variations in orientation between said carrier and said frame.

13. The circuit breaker of claim 12 further including adjustable force transmitting means positioned between the free end of said auxiliary latch and said overload member for adjusting the movement of said overload member necessary to pivot said auxiliary latch to said tripped position and thereby adjusting the overload current level necessary to unlatch said main latch and carrier and disconnect said fixed and movable contacts.

14. A multi-pole circuit breaker comprising a plurality of the circuit breakers of claim 12 arranged in juxtaposed relation, and further including gang means mechanically interconnecting said auxiliary latch for moving, in response to movement of one of said plurality of auxiliary latches to said tripped position, the remaining untripped auxiliary latches to their respective tripped position, thereby insuring the disconnection of all of said movable and fixed contacts should one pole of the circuit breaker be subjected to an overload current.

15. The circuit breaker of claim 12 wherein said auxiliary latch is mounted for pivotal motion about a fixed position axis perpendicularly disposed relative to said second plane, and
wherein said overload current responsive member includes a magnetically responsive device having:
(a) a stationary element mounted to said frame and in which magnetic flux is induced by an overload current, and
(b) a lever mounted to said frame for pivotal motion about a second axis parallel to said fixed position auxiliary latch axis, said lever having a first movable section spaced from said stationary element in the absence of an overload current which is adapted to move toward said stationary element in response to an overload current to cause said lever to pivot about said second axis, said lever having a second movable section adapted to contact said auxiliary latch at a specified point to pivot said auxiliary latch about its axis to said tripped position in response to pivotal movement of said lever caused by overload current induced movement of said first movable section.

16. In a circuit breaker having a housing, a stationary contact fixed to said housing, and a carrier movably mounted to said housing for movement between unlatched and latched positions wherein a movable contact carried by said carrier is alternatively electrically disconnected and selectively connectable with said stationary contact, respectively, the improvement comprising:
a movable main latch mounted to said housing at a first point for movement in a first plane between a latched position wherein said main latch engages and maintains said carrier in its latched position thereby enabling said fixed and movable contacts to be selectively connected, and an unlatched position wherein said carrier is free to return under the action of said spring to said unlatched position to electrically disconnect said fixed and movable contacts; and
a movable auxiliary latch mounted to said housing at a second point for movement in a second plane substantially perpendicularly to said main latch in said first plane in response to the occurrence of an overload, from a non-tripped position wherein said auxiliary latch engages said main latch at a common point and maintains said main latch and said carrier in their latched positions, to a tripped position wherein said main latch is free to move to its unlatched position and permit said carrier to return to its unlatched position to disconnect said fixed and movable contacts,
said auxiliary and main latches being further configured and oriented such that a first imaginary line connecting said first point where said main latch is mounted to said housing and said common point where said main latch engages said auxiliary latch is substantially parallel to a second imaginary line connecting said second point where said auxiliary latch is mounted to said housing and said common point where said auxiliary latch engages said latch, thereby providing a compact resettable circuit breaker.

17. The improvement of claim 16 wherein said main latch is elongated and pivotally mounted to said housing for pivotal movement in said first plane perpendicularly to said auxiliary latch movable in said second plane and includes an abutment engageable by said latched carrier for urging said main latch substantially axially whereby the force between said main latch and said perpendicularly movable auxiliary latch in said latched and untripped positions, respectively, produced by the spring bias applied through said carrier to said main latch, is insignificant relative to the force between said abutment and carrier produced by said spring bias applied through said carrier, thereby enabling the contact pressure to be substantially increased without appreciably affecting the force necessary to move said auxiliary latch to said tripped position.

18. In a multi-pole circuit breaker having a plurality of juxtaposed stationary contacts, a plurality of juxtaposed spring-biased carriers movably mounted for movement between unlatched positions and latched positions wherein movable contacts carried by said carriers are alternatively electrically disconnected and selectively connectable, respectively, with their associated stationary contacts, the improvement comprising:

a plurality of tripping mechanisms each including:
(a) a housing;
(b) a movable main latch mounted to said housing at a first point for movement in a first plane between a latched position wherein said main latch engages and maintains said carrier in its latched position thereby enabling said fixed and movable contacts to be selectively connected, and an unlatched position wherein said carrier is free to return under the action of said spring to said unlatched position to electrically disconnect said fixed and movable contacts;
(c) a movable auxiliary latch mounted to said housing at a second point for movement in a second plane substantially perpendicularly to said first plane in response to the occurrence of an overload, from a non-tripped position wherein said auxiliary latch engages said main latch at a common point and maintains said main latch and said carrier in their latched positions, to a tripped position wherein said main latch is free to move to its unlatched position and permit said carrier to return to its unlatched position to disconnect said fixed and movable contacts,
said auxiliary and main latches being further configured and oriented such that a first imaginary line connecting said first point where said main latch is mounted to said housing and said common point where said main latch engages said auxiliary latch is substantially parallel to a second imaginary line connecting said second point where said auxiliary latch is mounted to said housing and said common point where said auxiliary latch engages said latch, thereby providing a compact resettable circuit breaker; and gang means mechanically interconnecting said auxiliary latches for moving, in response to tripping of one of said plurality of auxiliary latches, the remaining untripped auxiliary latches to their respective tripped positions, thereby insuring the disconnection of said movable and fixed contacts should one pole of the circuit breaker be subjected to an overload current.

19. The improvement of claim 18 wherein said main and auxiliary latches are pivotally mounted to said housing for movement in said first and second perpendicular planes, and wherein said main latches include cams cooperable with cam followers on their associated auxiliary latches for pivoting said associated auxiliary latches beyond the position to which said auxiliary latches are pivoted in response to an overload.

20. A circuit breaker comprising:
a housing;
a stationary contact fixed to said housing;
a spring-biased carrier movably mounted to said housing for movement between unlatched and latched positions wherein a movable contact carried by said carrier is alternatively electrically disconnected and selectively connectable with said stationary contact, respectively;
a pigtail connected to said movable contact;
an overload current responsive member connected to said pigtail and movable from a non-overload to an overload position in response to an overload current through said member, said movement of said member being transverse to movement of said carrier to render said movement of said member independent of forces transmitted to said member from said moving carrier by said pigtail;
a movable main latch mounted to said housing at a first point and movable in a first plane between a latched position wherein said main latch engages and maintains said carrier in its latched position thereby enabling said fixed and movable contact to be selectively connected, and an unlatched position wherein said carrier is free to return under the action of said spring to its unlatched position to electrically disconnect said fixed and movable contacts; and
a movable auxiliary latch mounted to said housing at a second point and movable in a second plane substantially perpendicular to said first plane in response to movement of said overload member upon occurrence of an overload, from a non-tripped position wherein said auxiliary latch engages said main latch at a common point and maintains said main latch and said carrier in their latched positions, to a tripped position wherein said main latch is free to move to its unlatched position and permit said carrier to return to its unlatched position to disconnect said fixed and movable contacts,
said auxiliary and main latches being further configured and oriented such that a first imaginary line connecting said first point where said main latch is mounted to said housing and said common point where said main latch engages said auxiliary latch is substantially parallel to a second imaginary line connecting said second point where said auxiliary latch is mounted to said housing and said common point where said auxiliary latch engages said point where said auxiliary latch engages said latch, thereby providing a compact resettable circuit breaker.

References Cited
UNITED STATES PATENTS

| | | | |
|---|---|---|---|
| 3,179,768 | 4/1965 | Koval et al. | 335—10 |
| 2,779,831 | 1/1957 | Thomas | 200—50(.3) |
| 2,503,409 | 4/1950 | Platz et al. | 337—43 |
| 2,357,770 | 9/1944 | Runke | 337—72(X) |
| 2,067,935 | 1/1937 | Lingal | 335—9 |
| 1,912,109 | 5/1933 | van Valkenburg et al. | 337—155 |

BERNARD A. GILHEANY, Primary Examiner

D. M. MORGAN, Assistant Examiner

U.S. Cl. X.R.

337—75

UNITED STATES PATENT OFFICE
CERTIFICATE OF CORRECTION

Patent No. 3,566,326              Dated February 23, 1971

Inventor(s) William H. Middendorf et al

It is certified that error appears in the above-identified patent and that said Letters Patent are hereby corrected as shown below:

Column 19, line 64 (Claim 5) "inducted" should be --induced--

Column 19, line 73 (Claim 5) after "about said" insert --second--.

Column 20, line 57 (Claim 8) "said", second occurrence, should be --main--.

Column 20, line 71 (Claim 8) "asid" should be --said--.

Column 21, line 31 (Claim 12) "carrier" should be --carried--

Signed and sealed this 3rd day of August 1971.

(SEAL)
Attest:

EDWARD M. FLETCHER, JR.            WILLIAM E. SCHUYLER, JR.
Attesting Officer                   Commissioner of Patents

FORM PO-1050 (10-69)